United States Patent [19]

Treidl

[11] 4,442,319
[45] Apr. 10, 1984

[54] TELEPHONE ACCESSIBLE APPLIANCE CONTROL SYSTEM

[76] Inventor: Bernhard L. Treidl, 2 Soldiers Field Park, Apt. #501, Boston, Mass. 02163

[21] Appl. No.: 238,598

[22] Filed: Feb. 26, 1981

[51] Int. Cl.³ .......................................... H04M 11/00
[52] U.S. Cl. ................................. 179/2 A; 340/310 R
[58] Field of Search ................. 179/2 A, 2 R, 2 AM, 179/5 R, 5 P, 2 DP, 2.51; 340/147 R, 147 B, 147 PC, 147 P, 148, 652, 310 R, 310 A, 310 CP, 825.06, 825.07

[56] References Cited

U.S. PATENT DOCUMENTS

| | | | |
|---|---|---|---|
| 2,567,908 | 9/1951 | Levy | 340/216 |
| 3,280,259 | 10/1966 | Cotter | 179/2.5 R |
| 3,492,426 | 1/1970 | Foreman et al. | 179/2 A |
| 3,521,267 | 7/1970 | Lester et al. | 179/2.5 R |
| 3,529,216 | 9/1970 | Kolm et al. | 325/394 |
| 3,787,624 | 1/1974 | Spitalny et al. | 179/2 A |
| 3,886,534 | 5/1975 | Rosen et al. | 340/216 |
| 3,925,763 | 12/1975 | Wadhwani et al. | 340/164 R |
| 3,949,172 | 4/1976 | Brown et al. | 179/2.5 R |
| 3,992,587 | 11/1976 | Puckett et al. | 179/2 A X |
| 4,021,615 | 5/1977 | James et al. | 179/2 A |
| 4,058,678 | 11/1977 | Dunn | 179/2.5 R |
| 4,064,367 | 12/1977 | O'Malley | 179/2 A |
| 4,095,050 | 6/1978 | Beachem et al. | 179/2 A |
| 4,100,375 | 7/1978 | Noller | 179/2 A |
| 4,174,517 | 11/1979 | Mandel | 179/2 A X |
| 4,203,096 | 5/1980 | Farley et al. | 340/538 |

OTHER PUBLICATIONS

"Using Existing House Wiring for Computer Remote Control," *Popular Electronics*, D. Sokol et al., vol. 12-6, Dec. 1977, pp. 60-66; vol. 13-1, Jan. 1978, pp. 60-62; vol. 13-2, Feb. 1978, pp. 74-77.

*Primary Examiner*—G. Z. Rubinson
*Assistant Examiner*—W. J. Brady
*Attorney, Agent, or Firm*—Moss, Bensette, Thompson, Squires

[57] ABSTRACT

A control system is disclosed for switching on or off appliances or other electrical devices at predetermined or preselected times. The timing or sequencing of switching on or switching off any appliances can be set or changed as desired by telephoning the system from a remote telephone and providing appropriate encoded instructions through the telephone lines. The system includes a central clock driven controller and one or more remote addressable switching means which communicate with the central controller through conventional power lines. The central controller includes a power line interface for generating and impressing control signals on the power lines, a telephone interface and tone decoder for receiving incoming telephone instructions, and a microprocessor and memory for processing incoming instructions and operating the power line interface. The system includes feedback means for determining the operational status of the remote addressable switching means. Each remote addressable switching means includes a power line interface for receiving incoming signals, a power switch for switching on or off an appliance, and control logic for selecting appropriate incoming signals and operating the power switch.

10 Claims, 10 Drawing Figures

TELEPHONE ACCESSIBLE APPLIANCE CONTROL SYSTEM

This invention provides a system for turning on and off a number of remotely located electrical devices from a central location depending on the time of day, and the day of the week or year. The time at which a particular device is to be turned on or off may be selected or modified by communicating with the central location through the telephone network.

Heretofore, it has been possible to turn on or off a selected electrical device by means of a clock switch interposed between the power outlet which feeds the device and the device itself. The clock switch would run on a 24 hour basis and at a predetermined time during the day or evening turn on the device, and conversely, at a predetermined subsequent time turn off the device. If several electrical devices within a common electrical network, as for example a domestic household network, were sought to be controlled at once, several clock switches would have to be dispersed around the house, one for each device sought to be controlled. Particular disadvantages are found to be inherent in a time dependent switching system such as this. For example, a power failure would necessitate resetting several clocks throughout the house to ensure that proper timing of the turn on and turn off of the devices would occur once power was restored. Moreover, the times selected for turning on and turning off the various devices could only be changed by manually moving various stops and pins in the clock switch mechanisms so that they trip the associated switches at the new selected times. Where several devices are sought to be controlled in a time dependent fashion, changing the turn on and turn off times of each device would require attending at each clock switch to alter the time setting. This of course would necessitate physically being present at the clock switch to move the stops or pins to the new desired time position.

A mechanical 24 hour clock does not permit timing the turning on and turning off of electrical devices on other than a 24 hour basis. It would therefore be impossible to control the timing of a particular device over say a 7-day period or over a 365-day period. It has been found that these types of shortcomings made it difficult to use mechanical timing devices for other than very simple day to day applications. A 24 hour clock would not allow turning on and turning off of outdoor lights corresponding to lengthening and shortening days over a 365-day period without necessary and frequent manual re-adjustment of the trip pins on the 24 hour clock. Similarly, altering the timing of turning on and turning off of an appliance over a 7-day period requires frequent manual re-adjustment of the trip pins in the mechanical 24 hour clock device.

SUMMARY OF THE INVENTION

In the present invention, a switching apparatus for the time dependent switching of a plurality of electrical loads on a common three wire electrical distribution network is disclosed wherein a single centrally located control means is used to control a number of remotely located electrical load devices. The timing of the turning on and turning off of the remotely located devices can be changed or modified either by attendance at the central location wherein these remote devices are controlled, or it may be modified by dialing up the central location from a remote telephone station and, by appropriate encoded instructions, change or modify the timing or sequencing of the turning on and turning off of any of the devices or electrical loads attached to the common three wire electrical distribution network. The central location has a clock driven control means which communicates with one or more addressable switching means via the three wire electrical distribution network. At a previously selected time, the control means generates a load control signal and injects this into the electrical distribution network where it is carried to all of the addressable switching means connected to the three wire electrical distribution network. Each addressable switching means responds to the load control signal by doing nothing or by connecting its associated electrical load to the electrical distribution network, or by disconnecting its associated electrical load from the electrical distribution network. In this way, remote electrical loads may be engaged or isolated from the electrical distribution network in a time dependent fashion.

To permit storage of the turn on or turn off times for each device on the common three wire electrical distribution network, a data structure is provided which is used to store a series of codes which indicate which devices are to be turned on or off and at what time they are to be turned on or off. The codes stored in the data structure are produced or modified by a tone decoder means that produces coded signals to be stored in the data structure in response to tones which it receives and decodes. The aforesaid tones can be produced by a tone generation means which is also at the central site, or the tones may be received over an ordinary telephone line and, for this purpose, the invention is provided with a telephone interface which can be used to interconnect the tone decoder means with the subscriber loop servicing the premises containing the common three wire electrical distribution network. Using the telephone network enables persons utilizing the invention to select turn on and turn off times of the various electrical loads controlled by the invention from virtually anywhere in the world where telephone access may be had to the subscriber loop interfaced with the invention.

According to the invention, there is provided a switching apparatus for time dependent switching of electric loads on a common three wire electrical distribution network comprising at least one addressable switching means adapted to be connected to a three wire electrical distribution network for selectively engaging or isolating a respective electrical load from the three wire electrical distribution network in response to a predetermined load control signal. Clock means is provided for producing a coded current time signal representative of a day and the time of day. Tone decoder means is provided for producing a predetermined coded signal corresponding to any series of unique tones out of a set of unique tones. Local tone generation means is connected to the tone decoder means for producing any series of unique tones out of a set of unique tones. Telephone interface means is adapted to be operatively coupled between a subscriber loop of a telephone network and the tone decoder means and being responsive to a predetermined number of ringing signals detected on the subscriber loop, whereby the tone decoder means will be connected to the subscriber loop and thereby receive any series of unique tones out of a set of unique tones produced by a remote tone generation means at the call originating telephone in the telephone network. A data structure is in communication with the tone decoder means for storing a plurality of coded signals produced by the tone decoder means thereby forming one or more device control codes, each device control code including an electrical load address identifying a particular addressable switching means and a set point time code for identifying a particular coded current time signal. Also control means is connected to and responsive to signals produced by the clock means and adapted to communicate with the addressable switching means via the three wire electrical distribution network and in communication with the data structure, whereby a load control signal is produced by the control means in response to a match between a set point time of any device control code stored in the data structure and the current time signal, thereby engaging or isolating a respective electrical load from the three wire electrical distribution network.

DESCRIPTION OF THE DRAWINGS

Preferred embodiments of the present invention will now be described by way of example with reference to the accompanying drawings, in which.

DESCRIPTION OF EMBODIMENTS OF THE INVENTION

Figure 1:
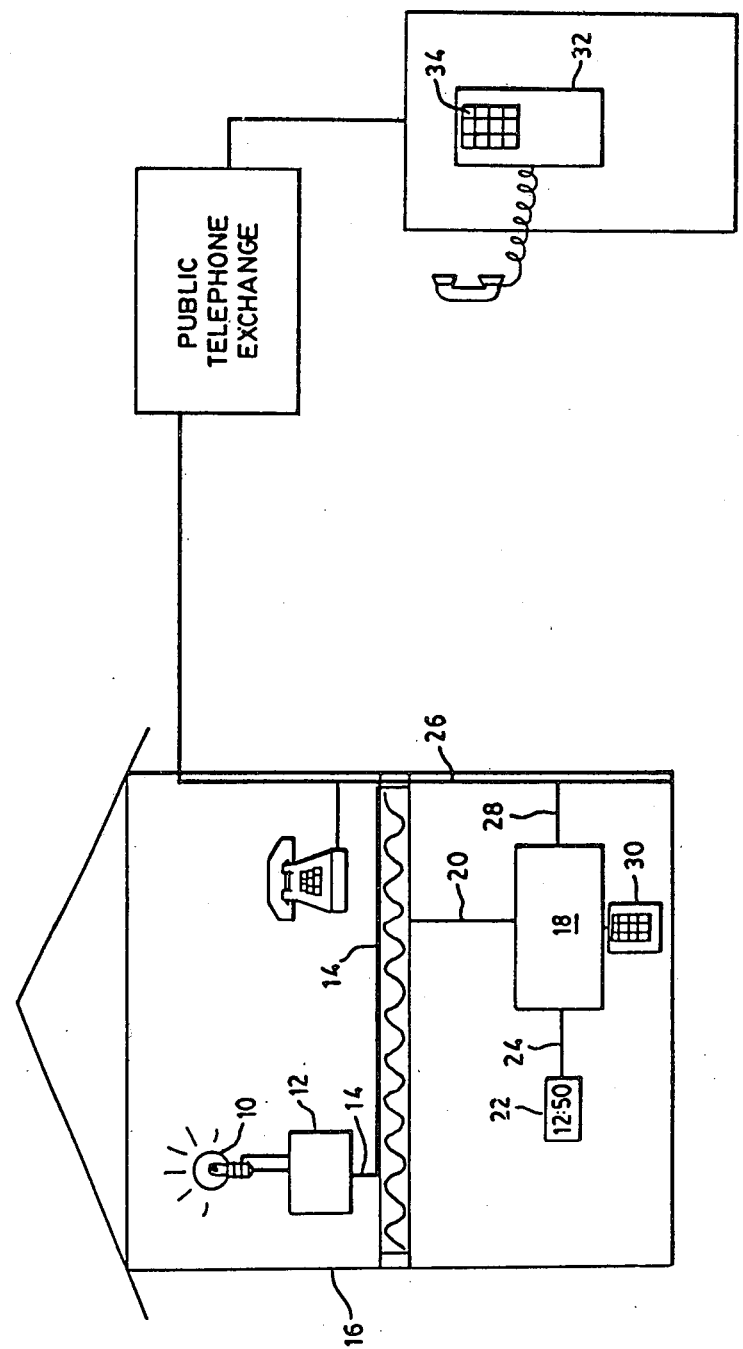
FIG. 1 is a pictorial overview of an embodiment of the telephone accessible appliance control system.

A diagrammatic drawing showing how the present invention is installed incorporating the preferred embodiments of the invention is shown in FIG. 1. A remote device 10, shown to be an electric lightbulb, is connected to an addressable switching means 12 which in turn is connected to a three wire electrical distribution network 14 shown to be common to the home 16. A control means or controller 18 is shown attached to the electrical distribution network 14 via power lead 20 and to clock 22 via timing lead 24 and to the telephone line 26 via telephone lead 28.

Shown below the controller 18 is a local tone generation means 30 which can be used to select the turn on and turn off times of remote device 10 in the fashion described in more detail hereafter.

Telephone line 26 runs from home 16 to remote telephone 32. Keyboard 34 of remote telephone 32 can be used to produce tones which are identical to those produced by tone generation means 30. Thus remote device 10 may be turned off or turned on at the time set points established by entries keyed in at tone generation means 30 or remote keyboard 34.

Figure 2:
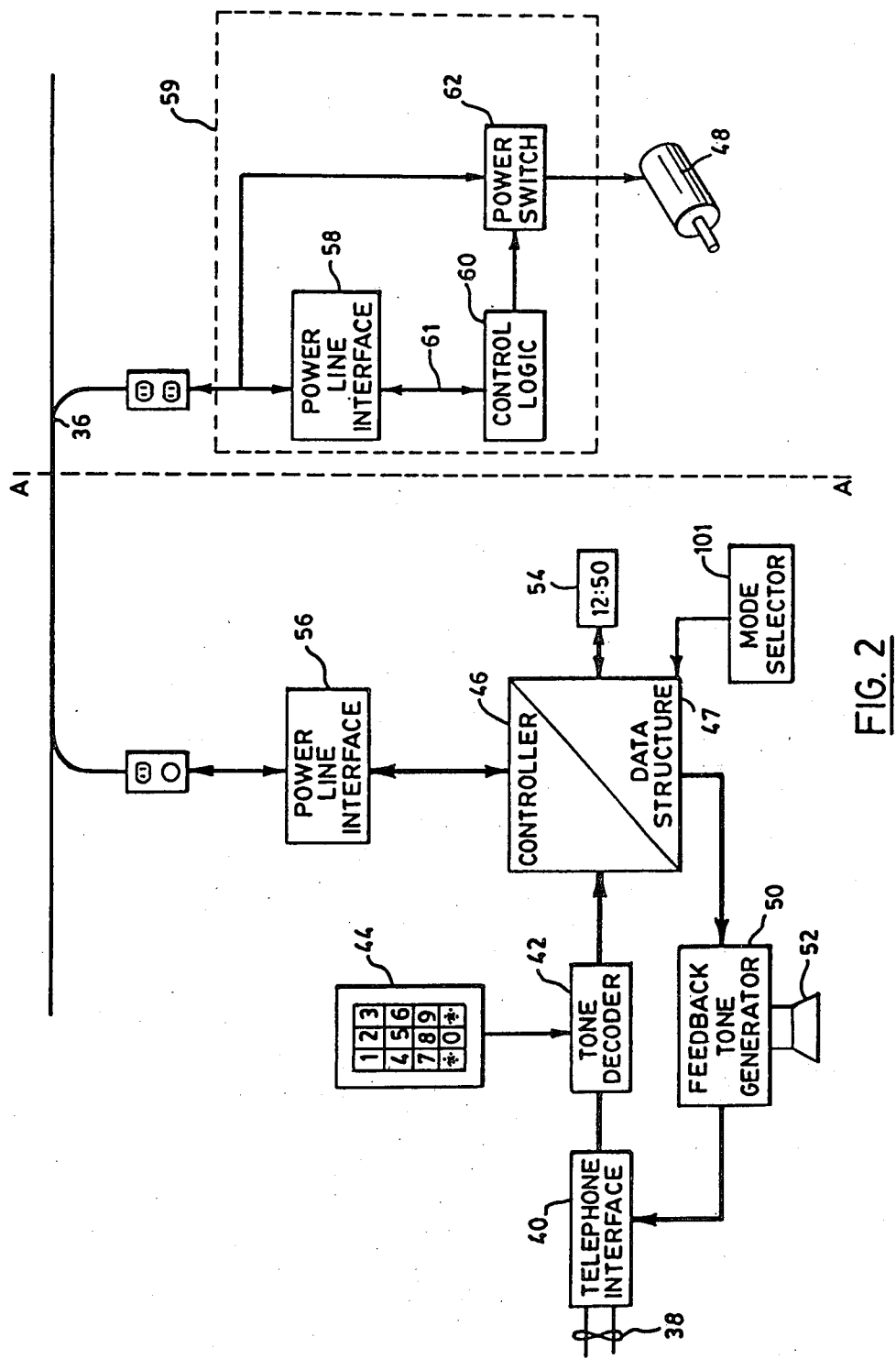
FIG. 2 is a block diagram of an embodiment of the telephone accessible appliance control system showing salient functional blocks.

Turning now to FIG. 2, a block diagram of an embodiment of the telephone control system is shown. The central control elements of the system are shown on the left-hand side of the dotted line A—A and a single remote addressable switching unit for control of remote appliance 48 is shown on the right of the dotted line A—A. Running across the dotted line is shown an AC power wire 36 which is used to provide both a power path and a communication path between the control unit on the left and the addressable switching unit on the right. It should be understood that the AC power wire 36 consists of a three wire cable as is usually found in a household or industrial wiring network. Moreover, the remote appliance 48 may be any electrical load. The control unit is in communication with the telephone network via the subscriber loop 38 shown at the far left of the diagram. Subscriber loop 38 is connected or disconnected from the central control unit by telephone interface 40. Telephone interface 40 serves two functions namely to detect incoming calls on subscriber loop 38 and to physically connect or disconnect the telephone accessible appliance control system from the subscriber loop. When the telephone accessible appliance control system is connected to the subscriber loop 38 through telephone interface 40, a communications path is set up to the tone decoder 42 whereby tones may be received thereby. Alternatively, tone decoder 42 may receive tones from tone generator 44. Tones received by tone decoder 42 are converted to digital signals which are passed to controller 46 where they are stored in a data structure 47 forming part of controller 46. A series of tones received by tone decoder 42 forms a coded signal or device control code, being an instruction to the controller 46 to cause the turn on or turn off of a remote appliance 48 at a specified time. When tones are successfully received and stored by controller 46, a digital control signal is sent to feedback tone generator 50 which generates a brief audible solid tone which may be heard through speaker 52 or which may be communicated back into the telephone network through subscriber loop 38 via telephone interface 40. When tones are not successfully received and stored by controller 46, as for example, if after a period of two or more minutes not enough tones are received to complete a device control code, a digital control signal is sent to feedback tone generator 50 causing it to generate a brief audible broken or intermittent tone which may be heard through speaker 52 or which may be communicated back into the telephone network through subscriber loop 38 via telephone interface 40.

The foregoing process enables the controller 46 to store or modify the device control codes (i.e. the turn on and turn off times (set point times) of one or more of a plurality of remotely located electrical loads, of which FIG. 2 shows only one, namely an appliance 48) stored in data structure 47. Once the turn on and turn off times contained within each of the device control codes have been stored by controller 46, the time of day shown or displayed on display 54 is intermittently examined then compared by controller 46 against all turn on or turn off times for each of the device control codes contained in data structure 47 to determine if a remote electrical load needs to be turned on or turned off. When the controller 46 determines that remote electrical load must be turned on or turned off, based on the previously stored turn on and turn off times contained within the stored device control codes and the time indicated by clock 54 (i.e. a match occurs between a device control code, set point time and the current time including the day of the week or year), a digital load control signal is sent to power line interface 56 where the load control signal is converted to a high frequency Frequency Shift Key (FSK) encoded load control signal that is injected into the AC power line system 36. The high frequency FSK encoded load control signal passes along the AC power line 36 to all remote addressable switching units of which one is shown in dotted box 59 in FIG. 2 on the right of the dotted line A—A. The high frequency FSK encoded load control signal is received by a second power line interface 58 where it is converted or demodulated into a digital load control signal. The digital load control signal so received is fed into control logic 60 via lead 61 wherein the control logic determines whether power switch 62 should be turned on or turned off thereby turning on or turning off appliance 48.

Figure 3:
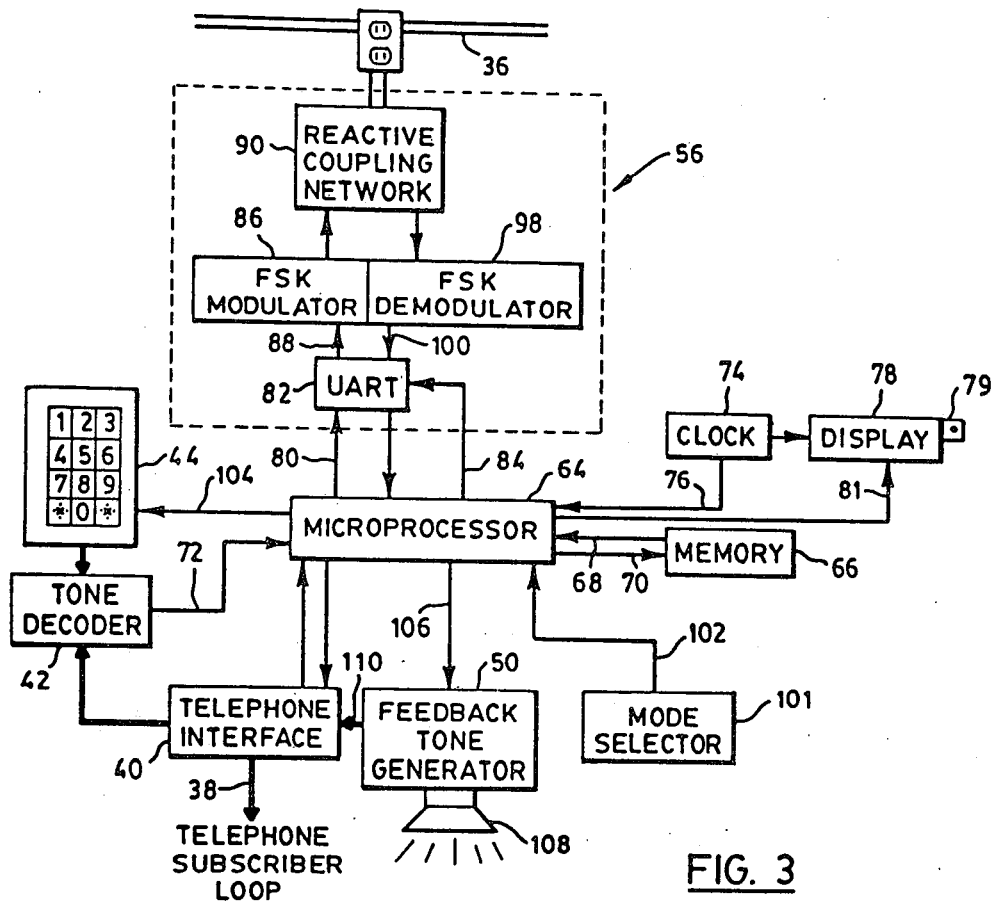
FIG. 3 is a detailed electrical block diagram of the central control elements.

Turning now to FIG. 3, interconnection of the elements of the preferred embodiment of the central control unit is shown in more detail. As may be seen, controller 46 of FIG. 2 is comprised of microprocessor 64 and associated memory 66 in communication with each other through digital data paths 68 and 70. When tone decoder 42 is in operation, tones are decoded one at a time into binary coded decimal (BCD) coded digital signals and fed serially to microprocessor 64 via digital data path 72. Microprocessor 64 accumulates this series of BCD coded digital signal tones in a scratch pad register contained within microprocessor 64. The scratch pad register essentially acts as shift register whereby a series of BCD coded digits (i.e. decoded tones) is serially received. When a complete series of decoded tones forming a device control code is received, microprocessor 64 examines the contents of the scratch pad register and causes same to be written into memory 66 via digital data path 70. In this fashion, a device control code, containing time set point and appliance address information, received by the central control unit is stored for future execution at the appropriate moment in time as determined by clock 74.

Clock 74 is a standard digital alarm clock chip which provides the microprocessor 64 with a digitally encoded time signal via digital data path 76. The time of day contained by clock 74 is examined by microprocessor 64 at fixed intervals throughout the day and compared with the time set points contained within each of the device control codes stored in memory 66. When the time of day advances past a set point stored in memory 66, microprocessor 64 initiates a process to turn on or turn off a remote device. Microprocessor 64 may be, and in the preferred embodiment is, programmed to keep track of the day of the year thereby permitting control of remote appliances on a 7-day or 365-day cycle. This combination of the time of day contained by clock 74 and the 7-day or 365-day cycle contained by microprocessor 64 will hereafter be referred to as the current time.

To turn on or to turn off a device, microprocessor 64 retrieves the device control code, which contains the set point time and electrical load address, from memory 66 via digital data path 68 and stores this information in a scratch pad register contained within microprocessor 64. It should be understood that this retrieval step is only performed when a match occurs between the current time and the set point time of a device control code. Microprocessor 64 then extracts the electrical load address information from the device control code now in the scratch pad register and makes this electrical load address information available to power line interface shown generally by numeral 56, via digital data path 80. As may be seen, digital data path 80 is in communication with a device commonly known as a UART 82. The term UART is an acronym for Universal Asynchronous Receiver Transmitter. Once the electrical load address information has been received by the UART, microprocessor 64 instructs, via control line 84, the UART 82 to transmit this information. Thereafter, the electrical load address information contained in UART 82 is serially fed from the UART to a frequency shift key modulator 86 via digital data line 88. The conversion of the electrical load address information from digital level to a high frequency AC signal by the frequency shift keying modulator (FSK modulator) is necessary to ensure that the electrical load addressing signal may be superimposed on and removed from the power signal without one signal interfering with the other. The superposition or injection of the electrical load address, or device control code signal into the power distribution network 36 is accomplished by a reactive coupling network 90 which is shown in more detail in FIG. 7. In the preferred embodiment of the present invention, the FSK modulator was tuned to provide a 100,000 Hertz mark frequency and a 150,000 Hertz space frequency. These frequencies are well separated from the 60 Hertz AC power transmission frequency and therefore separation of the control signal from the power signal is relatively easy to accomplish.

Figure 7:
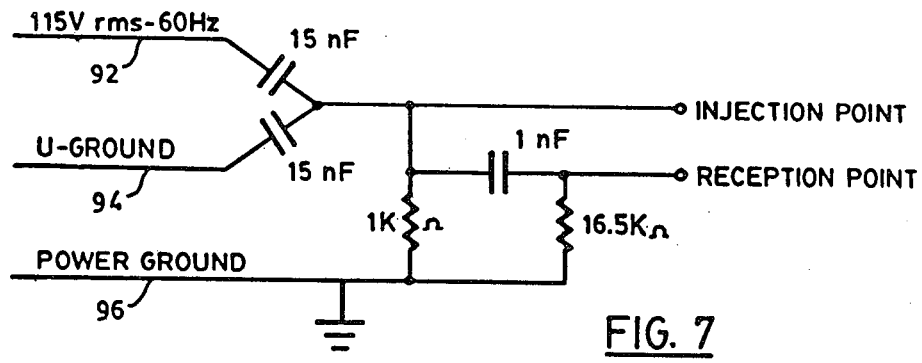
FIG. 7 is a schematic diagram of an AC power line reactive coupling network.

Referring now to FIG. 7, the reactive coupling network used in the preferred embodiment of the present invention will be explained in detail. On the left-hand side of FIG. 7, is shown the three wire cable commonly found in domestic wiring and previously referred to as AC distribution network 36. This three wire cable is composed of a hot wire 92, utility ground 94 and a local power ground 96. Rough measurements of the characteristic impedance of this three wire cable as measured between the power ground 96 and the utility ground 94 and hot wire 92 was found to be in the neighbourhood of 50 to 100 Ohms at a frequency of 100 KHZ. Wires 92 and 94 are interconnected with two 15 nF capacitors, the mid-point of these capacitors being fed to power ground 96 via a 1 K Ohm resistor. This arrangement provides a high pass filter between the three wire cable and the terminal labelled "injection point" in FIG. 7. The signal at the injection point is passed through a second high pass filter composed of a 1 nF capacitor and a 16.5 K Ohm resistor. The output of this second high pass filter provides a "reception point" as labelled where the high frequency control signals may be received. Examination of the reactive coupling network at a frequency of 60 Hertz reveals that the common mode power signal, namely the 60 Hertz signal, will be attenuated by a factor of approximately 354 at the injection point and by a factor of 56,860 at the reception point. On the other hand, at the 100,000 Hertz mark frequency the control signal will be attenuated by a factor of only 1.2 at the reception point. As will be understood, the attenuation at the space frequency of 150,000 Hertz will be less than the 1.2 attenuation factor by virtue of the operation of the high pass filter.

As can be appreciated by the foregoing discussion, reactive coupling network 90 provides a window between the FSK modulator 86 and the AC distribution network 36 but is relatively opaque to the power frequencies carried on AC distribution network 36. Power line interface 56 is also provided with a FSK demodulator 98 which is used to convert the space and mark frequencies received from power distribution network 36 into digital levels which will be communicated to UART 82 via data line 100.

Shown in FIG. 3 is mode selector 101 which is used to enable microprocessor 64 to carry out a variety of functions. In its normal operating mode, microprocessor 64 examines the clock 74 periodically to determine the time of day portion of the current time and subsequently examines memory 66 to determine if any remote electrical loads have to be engaged or isolated from the power distribution network. While doing this periodic checking the microprocessor 64 may also be interrupted by tone decoder 42 whereby it will receive the serial BCD encoded digits which the tone decoder generates in response to tones as previously explained. The mode selector may also condition the microprocessor to activate tone generator 44 via control line 104, whereby tones produced by tone generator 44 may be fed into the tone decoder and received by the microprocessor. Mode selector 101 may also condition the microprocessor to sequence through memory 66 and present the data stored therein, namely, all of the device control codes upon display 78. In this latter mode, the time representations normally shown on display 78 produced by clock 74 would be suppressed to enable the data retrieved from memory 66 by microprocessor 64 to be shown on disppplay 78 via a digital data path contained in communication link 81.

Feedback tone generator 50 is connected to microprocessor 64 via control line 106. The purpose of the feedback tone generator 50 is to produce an audible tone via speaker 108 to indicate whether the decoded tones have been properly placed into memory 66 by microprocessor 64. In the preferred embodiment of the invention, feedback tone generator 50 will produce a brief solid 1 KHZ tone when time set point data has been properly stored in memory 66 and a brief broken 1 KHZ tone when time set point data could not be stored in memory 66 because of errors. As may be seen, feedback tone generator 50 is also connected to the telephone subscriber loop 38 via bus 110 thereby permitting the aforesaid tones to be transmitted to a remote telephone not shown in FIG. 3.

Also, microprocessor 64 activates feedback tone generator 50 via conrol line 106 whereby the feedback tone generator 50 produces an ongoing broken, or intermittent, tone to indicate the status of past operation of the telephone accessible appliance control device in the following manner. If the AC power signal on AC power line 36 disappears (as it would during a power outage), the operation of the device would not be reliable when the power was re-stored after an indeterminant period of time. For example, clock 74 might indicate the wrong time (it would indicate the correct time if a standby battery and suitable power source, not shown, were provided), or various appliances might not have been turned on or turned off during the outage. Therefore, microprocessor 64, detects a power outage and, upon power being re-stored, causes feedback tone generator 50 to produce an ongoing broken, or intermittent, tone which can be heard from speaker 108 or over any remote telephone (not shown) which accesses subscriber loop 38 thereby causing telephone interface 40 to connect the telephone accessible appliance control device to subscriber loop 38. As may be appreciated, the operator hearing the ongoing broken tone will be alerted to the fact that a power failure has occurred. It is then necessary for the operator to restore the operation of the telephone accessible appliance control device by setting clock 74 to the correct time, if necessary, and by temporarily placing mode selector 101 to a re-set mode which causes microprocessor 64 to stop tone generator 50 from producing the broken tone. Thereafter, the operator places mode selector 101 in the local or remote mode as desired whereby normal operation may continue. It should be understood that the ongoing broken tone may be heard by an operator dialing up subscriber loop 38 from a remote telephone (not shown in FIG. 3).

Figure 4:
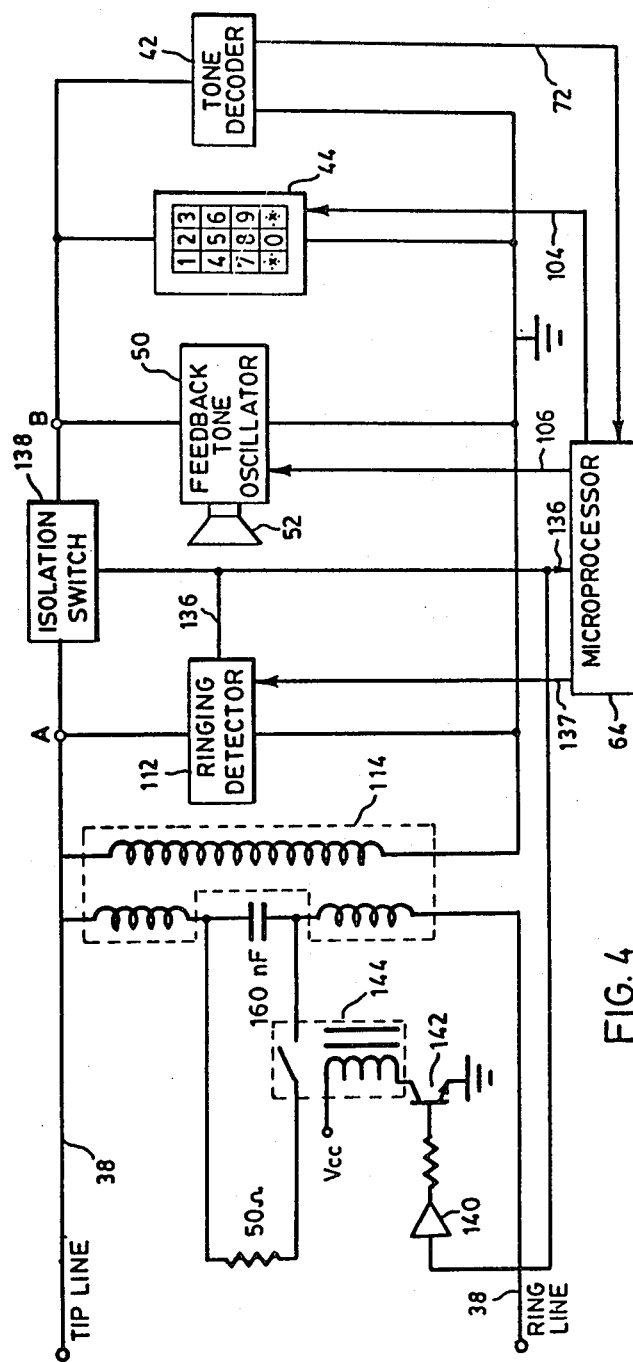
FIG. 4 is a detailed electrical block diagram of the telephone related elements of the telephone accessible appliance control system.
Figure 5:
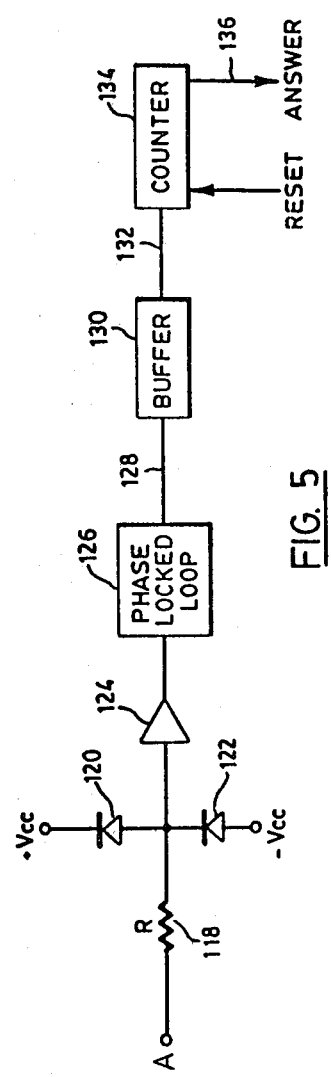
FIG. 5 is a detailed electrical block diagram of an embodiment of a ringing detector.

Referring now to FIG. 4, the telephone related apparatus of the telephone accessible appliance control system will be described. The telephone related apparatus serves two primary functions in the control system. First it provides a means for connecting and disconnecting the control system from the subscriber loop 38. Secondly, the telephone apparatus enables the transfer of tone coded information between the subscriber loop 38 and the microprocessor control system as well as the transfer of feedback tones from the control system to the subscriber loop 38. When it is desired to alter or create a turn-on or turn-off time for a particular appliance controlled by the appliance control system by telephone, a remote telephone is used to dial up the subscriber loop to which the control system is connected. The incoming call on subscriber loop 38 is detected by ringing detector 112 which is no more than a 20 Hertz ring detector. The 20 Hertz detector is coupled with the subscriber loop 38 via transformer 114. The transformer 114 is used to isolate the telephone related apparatus to the right of the transformer from the DC currents which are placed onto subscriber loop 38 by the telephone system. The most common telephone ringing signal provided by the telephone company is a $-48$ VDC superimposed on an 86 $V_{RMS}$ signal (F=20 Hertz). An electrical block diagram of the ring detector is shown in FIG. 5. Point A of FIG. 5 corresponds to point A of FIG. 4. The AC component of the ringing signal is transmitted between the subscriber loop 38 and point A by transformer 114. Resistor 118 and diodes 120 and 122 are provided to limit the magnitude of the ringing signal received by buffer amplifier 124. The output of buffer amplifier 124 is fed into the input line of a phase locked loop 126 which is tuned to a center frequency of 20 Hertz. The output line from the phase locked loop 126 remains low at 0 volts until a continuous 20 Hertz frequency is received by phase locked loop 126. When this 20 Hertz signal is received by the phase locked loop, line 128 is driven high which causes the input to buffer 130 to go high. Buffer 130 is a Schmidt Trigger which ensures that the output 132 of buffer 130 contains a pulse of uniform time duration each time the buffer input goes high for an uncertain length of time. Once line 132 goes high, counter 134 is incremented by 1. Once counter 134 reaches a predetermined count by repeated ringing on subscriber loop 38, the answer line 136 is driven high. Referring now to FIG. 4, we see answer line 136 is connected to isolation switch 138, microprocessor 64 and buffer amplifier 140.

The effect of line 136 going high is to cause isolation switch 138 to close thereby connecting point A with point B thus completing the ladder network to the right of transformer 114. Buffer amplifier 140 activates causing transistor 142 to saturate thereby activating relay 144 thereby placing subscriber loop 38 "off hook". When subscriber loop 38 is placed off hook, it is the equivalent of the incoming call being "answered" by the telephone apparatus of the control system. Once the telephone is answered, tones may be received by the control system from the remote telephone which originated the incoming call. The microprocessor 64 is alerted to the incoming call via the same control line 136 which is shown to be connected to the microprocessor. The control line 136 acts as an interrupt to the microprocessor thereby causing it to commence processing the telephone handling routine. The telephone handling routine will prepare and permit the microprocessor 64 to receive decoded digits from tone decoder 42 as they are received by it. Once all incoming information is received by the telephone accessible appliance control device, or when the caller hangs up, microprocessor 64 finishes executing the telephone handling routine by pulsing re-set line 137. This pulsing of re-set line 137 causes output line 136 of ringing detector 112 to be driven low thereby opening relay 144 and isolation switch 138. The opening of relay 144 causes the DC current path of subscriber loop 38 to be broken which is the equivalent of placing the subscriber loop "on hook", or of hanging up.

The function of tone decoder 42 is to convert the tones presented to its input line connected to terminal B into a coded digital signal which is communicated to microprocessor 64 via line 72. Tone decoder 42 must be capable of decoding at least two tones, one to represent a logical zero or space and the other to represent a logical one or mark. Although a simple two tone decoder would be sufficient to enable communication with microprocessor 64, the preferred embodiment of the invention utilizes a dual tone multifrequency tone decoder which is compatible with the tones used by the telephone network to effect dialing thereon. The choice of a dual tone multifrequency tone decoder enables standard telephone tone dialing equipment to be used. A tone decoder which is capable of converting dual tone multifrequency tones into binary coded decimal digital signals in the preferred embodiment is manufactured by Mitel and is called the CM8828 Tone Receiver.

Figure 6:
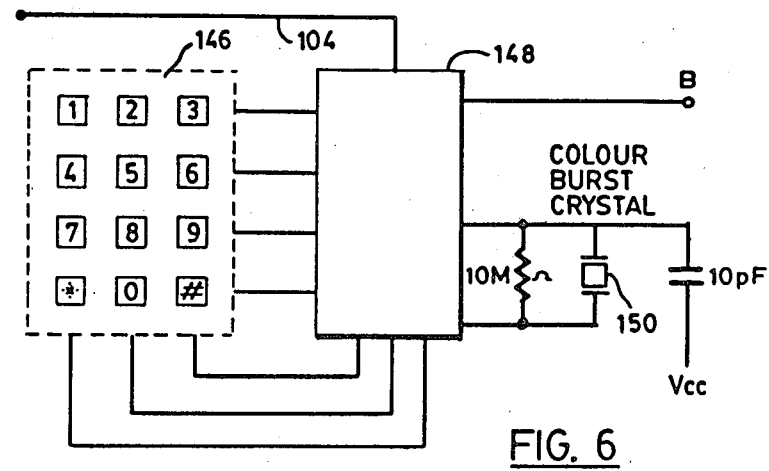
FIG. 6 is a detailed electrical block diagram of an embodiment of a tone generator.

Turning now to FIG. 6 the preferred embodiment of the local tone generator 44 is shown. When the mode selector 101 is placed in local mode the manual keyboard 146 and the dual tone multifrequency (DTMF) generator 148 are enabled by line 104 thereby allowing an operator to input the desired time set points and electrical load address information into the controller. In the preferred embodiment of the invention, the keyboard 146 and the DTMF generator 148 simulate a telephone tone dialer to make this mode of operation compatible with the remote mode of operation whereby signals are received from a remote telephone through subscriber loop 38. When the mode selector 101 is placed into the local mode, microprocessor 64 ensures that the connection to the subscriber loop 38 is broken by isolation switch 138 (referring to FIG. 4) by pulsing re-set line 137. This causes output line 136 of ringing detector 112 to go low thereby preventing tones produced locally by tone generator 44 from inadvertently dialing a telephone number on the telephone system since both relay 144 and isolation switch 138 will be opened when output line 136 is low. As may be appreciated, pulsing re-set line 137 may have no effect if line 136 is low at the time line 137 is pulsed because the fact that line 136 is low would mean that relay 144 and isolation switch 138 are already open.

The Mostek Corporation produces a series of integrated circuits which serve telephone tone dialing functions. The arrangement shown in FIG. 6 utilizes a Mostek MK5086 and keyboard which operate similar to an ordinary telephone dialer. The MK5086 provides a "staircase" approximation of the tones using digital to analog converters that produce an output within 1% of the telephone fundamental frequencies and which contain harmonics at levels 30dB or more below the fundamental. To enable the tone generator 148 to operate, a color burst crystal 150 (3.579545 MHz) must be provided. This crystal is conditioned with a resistor and capacitor tied to supply voltage $V_{cc}$ as shown in FIG. 6. As keys on the keyboard are depressed, tone pairs appear at terminal B corresponding to the key pad button which has been depressed. In turn these tones are decoded by tone decoder 42 (shown in FIG. 4) and are ultimately presented to microprocessor 64 as Binary Coded Decimal Digital Signals.

Referring back to FIG. 4, the operation of feedback tone oscillator 50 will now be explained. Microprocessor 64 will accumulate in a scratch pad shift register the series of digital signals representative of selected numbers presented to it by tone decoder 42 until a complete device control code is received. The device control code is comprised of a series of digits which indicate which device is to be turned on or turned off (i.e. the electrical load address, which may include a digit that will be used by the addressable switching means to turn on or to turn off its associated electrical load), and a series of digits identifying the particular time in which the device is to be either turned on or turned off (i.e. the set point time). Once the microprocessor has received this device control code comprised of the foregoing series of digits in its scratch pad shift register, the contents of the shift register are stored in memory 66, and the feedback tone oscillator 50 is activated by enable line 106. This causes a brief audible solid tone to be produced out of speaker 52 or to be communicated back to subscriber loop 38 through transformer 114. In this fashion, the reception of a complete device control code by the microprocessor can be communicated back to the operator whether he is inputting the numbers locally through keyboard 146 or remotely through a telephone. The feedback tone oscillator can be conditioned to produce a variety of tones. For example, a solid tone could be used to indicate that the code has been successfully received and placed into memory 66 and a broken or intermittent tone can be used to indicate that an error has occurred in the device control code which was not, because of the error, stored in memory 66. Feedback tone oscillator 50 can also be used to indicate whether a remote device has been turned on or turned off in response to a load control signal sent out along electrical distribution network 36 via UART 82. This second use of the feedback tone oscillator will be described in more detail subsequently.

Figure 8:
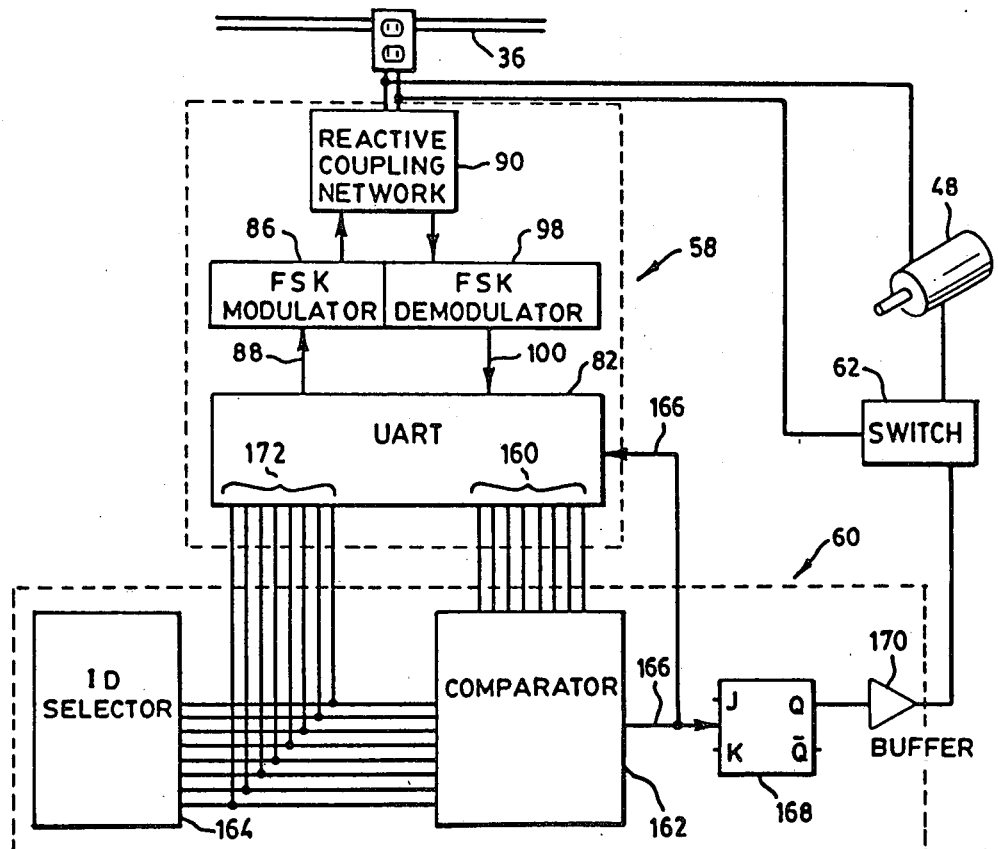
FIG. 8 is a detailed electrical block diagram of an embodiment of an addressable appliance switching device.

Referring now to FIG. 8, an embodiment of an addressable switching means for turning on and turning off remote appliance 48 is shown. The addressable switching means can be located in a number of places throughout the premises served by electrical distribution network 36. Each of the addressable switching means contained in the system may be identical in design but each would respond to a particular or unique electrical load control code whereby its associated electrical load 48 will be engaged or isolated from the electrical network.

Each addressable switching means utilized by the telephone accessible appliance control system contains two primary components. First is a power line interface 58 which is used to separate the coded electrical control signal from the power signal contained in the electrical distribution network 36. Secondly each addressable switching means contains control logic generally referenced by numeral 60 which analyzes the control signal detected by power line interface 58 and determines whether the detected control signal should be used to turn on or turn off electrical load 48 associated with the addressable switching means.

Shown in FIG. 8 are electrical block diagrams which detail an embodiment of an addressable switching means. The power line interface 58 is comprised of four major elements. Connecting the power line interface 58 to the electrical distribution network 36 is a reactive coupling network 90 which is identical in design to that shown in FIG. 7. The output from the reactive coupling network is a filtered high frequency AC FSK encoded electrical control code signal which excludes the 60 Hz power signal present on power distribution network 36. The filtered control signal is presented to the FSK demodulator 98 where it is converted into a digital level and fed serially into the serial port of UART 82 via bus 100. Once a complete device control code has been received, it appears at the parallel output bus 160 of UART 82. This coded signal is compared by comparator 162 to the coded signal set on ID selector 164. If there is a complete correspondence between the levels selected by ID selector 164 and the data appearing at output port 160, the output of comparator appearing on line 166 will make a transition which has the following two effects. First the transition causes JK flip-flop 168 to change state since line 166 is connected to the clock terminal of JK flip-flop 168 and since both J and K terminals are tied to logical "1". This change in state is transmitted to power switch 62 through buffer amplifier 170 thereby turning on or turning off electrical load 48. Additionally, comparator output line 166 is returned to UART 82 as shown which causes UART 82 to transmit the signal contained on ID selector 164 and appearing at the parallel input port 172 out along serial output line 88 through FSK modulator 86 and reactive coupling network 90 back into the electrical distribution network 36.

Accordingly, each time an addressable switching means receives a signal which causes a match with the ID selector, the addressable switching means generates an identical signal which is returned to the electrical distribution network 36. This return signal is a feedback signal which will be detected by the power line interface of the central control unit shown in FIG. 3 and identified by general reference numeral 56. This feedback load control signal will be expected by the microprocessor 64 as a "hand shake" signal to that which it has just sent out. When this feedback load control signal is received, microprocessor 64 causes the feedback tone generator 50 to emit a brief solid tone which is heard over speaker 108 or which is heard at the remote telephone and which indicates that the electrical load was turned on or turned off as requested. As may be appreciated, when the addressable switching means receives a signal which does not match with the ID selector, no further action takes place. Referring to FIG. 3, if no feedback load control signal (i.e. "hand shake") is received by microprocessor 64, microprocessor 64 causes feedback tone generator 50 to produce a brief series of tones, that is, a broken tone, which is heard over speaker 108 or which is heard at the remote telephone and which indicates that no electrical load was turned on or turned off as requested.

Figure 9:
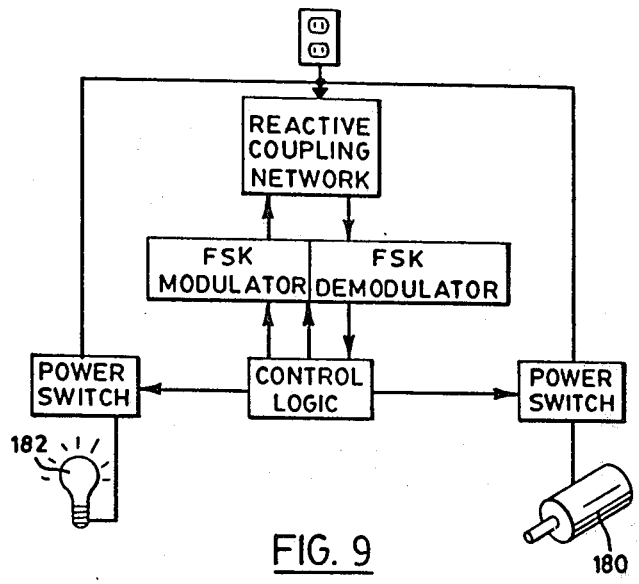
FIG. 9 is an electrical block diagram of an alternate embodiment of an addressable appliance switching device.
Figure 10:
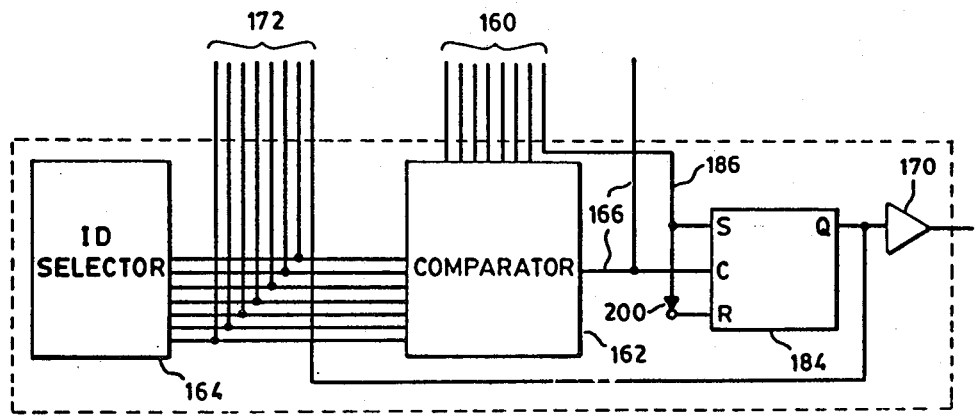
FIG. 10 is an electrical block diagram of an alternate embodiment of an addressable appliance switching device.

Referring again to FIG. 3, the previously referred to further non-essential use of feedback tone generator 50 will now be explained. As may be appreciated from the discussion in the foregoing paragraph, the brief tone emanating from speaker 108 is produced at the time previously selected for turning on or turning off the remote device (not shown). An intermittent tone is produced when microprocessor 64 fails to receive a "hand shake" feedback load control signal. The failure to receive a hand shake signal would occur when the appliance address of a particular device control code stored in memory 66 does not match any address or ID setting of those addressable switching means (as shown in FIGS. 8, 9 and 10) connected to the electrical distribution network 36. Since the broken tone is produced shortly after microprocessor 64 injects the appropriate load control signal into electrical distribution network 36 (i.e. at the selected time when the particular electrical load was to be turned on or turned off), it may be that no operator was present to hear the brief broken tone produced by speaker 108. Should this occur, the error condition manifested the broken tone emanating from speaker 108 would not come to the attention of the operator.

Although it is not essential to the operation of the telephone accessible appliance control device, the device control code stored within memory 66 may also contain a device status code in addition to the appliance address and set point time previously described. The use of this optional extra device status code would be as follows. When microprocessor 64 receives a complete device control code in its scratch pad shift register from tone decoder 42, the microprocessor 64 includes in the device control code so received an additional device status code which indicates that the addressable switching means identified by the appliance address portion of the device control code is operational. The completed foregoing device control code is written into memory 66 via digital data path 68 and thereafter feedback tone oscillator 50 is activated by enable line 106 causing a brief audible solid tone to be produced out of speaker 52 or to be communicated back to subscriber loop 38 through transformer 114. As before, the reception of a complete device control code by the microprocessor is communicated back to the operator. Similarly, broken or intermittent tone can be used to indicate that an error has occurred in the device control code which, because of the error, was not stored in memory 66. As may be appreciated, each time a device control code is added to memory 66, its associated device status code is set to indicate that addressable switching means identified by the appliance address portion of the device control code is operational.

Thereafter, microprocessor 64 intermittently examines the current time as before comparing same with the set point time contained in each device control code stored in memory 66. When a match occurs between a set point time and the current time, the complete device control code is retrieved from memory 66 and placed into a scratch pad register in microprocessor 64. The appliance address is extracted therefrom thereby ultimately forming the load control signal which is communicated with AC distribution network 36 via power line interface 56 as previously explained. If a hand shake or feedback load control signal is received back by microprocessor 64, microprocessor 64 may cause the feedback tone generator 50 to emit a brief solid tone which is heard over speaker 108, or microprocessor 64 may do nothing further since the hand shake indicates that the electrical load was turned on or turned off as requested. However, if the microprocessor 64 fails to receive a hand shake signal, the device status code of the device control code currently in the scratch pad register is changed to indicate that the electrical load was not turned on or turned off as requested. Thereafter, this modified device control code is stored in memory 66, replacing the device control code which was previously retrieved and stored in the scratch pad register. Indicator 79 of the display 78 is turned on via a digital data path contained in communication link 81 to give a visual indication that an error has occurred when microprocessor 64 attempted to turn on or turn off an electrical load. Optionally, feedback tone generator 50 may be activated by control line 106 to produce a brief broken tone at the time the microprocessor 64 failed to receive the hand shake. Should the operator thereafter see that indicator 79 is on, he may adjust mode selector 101 to condition the microprocessor 64 to sequence through memory 66 and present the data stored therein, namely, all of the device control codes, upon display 78 in the manner explained previously.

Now the additional use of feedback tone generator 50 will be explained having regard to the foregoing discussion of the device status code. When mode selector 101 is placed in local mode, the operator may present or input into microprocessor 64 via tone generator 44 just an appliance address instead of an entire device control code. Thereafter, microprocessor 64 will examine memory 66 for device control codes that have appliance addresses which match that which was input. For each match, the microprocessor 64 examines the device status code. If the corresponding device status code indicates an operational status, a brief unique solid tone will be produced by feedback tone generator 50 and heard over speaker 108. If the corresponding device status code indicates a non-operational status, a brief unique broken tone will be produced by feedback tone generator 50 and heard over speaker 108. If, however, no device control code can be found in memory 66 which has an appliance address matching that which was input, microprocessor 64 will cause tone generator 50 to produce a long broken tone. In this manner, the past operating status of all remote addressable switching means (i.e. see FIGS. 8, 9 and 10) may be polled by an operator utilizing local tone generator 44.

Moreover, the past operating status of all remote addressable switching means may be determined from anywhere in the world where telephone access may be had to the telephone accessible appliance switching device. As should be understood, telephone interface 40 responds to incoming calls on subscriber loop 38, when mode selector 101 is placed in remote mode, by answering the call thereby placing tone decoder 42 in communication with subscriber loop 38 and by placing feedback tone generator 50 in communication with subscriber loop 38. Therefore, any remote tone generator (not shown, but see FIG. 1) may be used in the exact same fashion as the local tone generator 44 to poll the past operating status of all remote addressable switching means. For each appliance address provided by the remote tone generator, feedback tone generator 50 is caused to produce a brief solid, brief broken, or long broken tone as before which will be communicated back to the operator of the remote tone generator. In this manner, an operator may be satisfied at any time and from virtually any location that the telephone accessible appliance control device is and has been properly operating.

Referring to FIG. 8, ID selector 164 is nothing more than a series of switches (sometimes referred to as a DIP switch bank) which are used to set the ID (identification) of the addressable switching means. Each addressable switching means has a different switch pattern on its ID selector thereby permitting each device within the electrical distribution network to be treated independently of the other. Conversely, addressable switching means which are provided with identical ID selector switch patterns will be treated identically with each other.

Other embodiments of the control logic for the addressable switching means may be proposed without departing from the general feature of the addressable switching means. For example, FIG. 9 illustrates an embodiment of the addressable switching means which contains control logic that permits one addressable switching means to control two electrical loads, namely load 180 or 182. Alternatively, the control logic may be configured to examine one bit of the load control signal and use that bit as instruction to either turn on or turn off its associated electrical load. As can be appreciated, the embodiment of the addressable switching means shown in FIG. 8 will respond to its corresponding electrical load control signal by turning on or turning off its associated electrical load having no regard to its present state. In other words, the embodiment of the addressable switching means shown in FIG. 8 will always respond to a load control signal which matches its ID by flip-flopping the electrical load on or off. FIG. 10 shows an embodiment of an electrical switching means which employs an RS latch 184 which is set or reset as determined by the digital level appearing on control line 186.

The addressable switching means of FIG. 10 includes an ID selector 164 which is used, as previously explained, to set the identification of the addressable switching means by the on or off position of each of several switches forming the ID selector. The setting of the ID selector is compared to the device address received by the UART (not shown) and appearing at the parallel output port 160 thereof. When a complete match occurs, the output line 166 of comparator 162 goes high thereby "clocking" the RS latch 164. The output Q of RS latch 164 is fed into buffer amplifier 170, the output therefrom is used to drive an appliance switch (not shown) in the same fashion as the addressable switching means embodiment shown in FIG. 8. The essential difference between the embodiment exemplified by FIG. 10 and those by FIGS. 8 and 9, is that one line (namely 186) of the output port 160 of the UART is applied to the S input of the RS latch 184 and is also inverted by inverter 200 and thereafter applied to the R input of the RS latch 184. As may be appreciated from the foregoing, the output Q of RS latch 184 will go high (thereby turning on the associated appliance, now shown) if line 186 is high because the RS latch 186 will be clocked by line 166 with the S line high and the R line low. Conversely, the output Q of RS latch 184 will go low (thereby turning off the associated appliance, not shown) if line 186 is low because the RS latch 186 will be clocked by line 166 with the S line low and the R line high. It will therefore be appreciated that with this embodiment of an addressable switching means, one of the output lines of UART parallel output port, shown generally by reference numeral 160, may be used to directly control the on or off state of the associated appliance. Moreover, this direct control feature does not require a change or modification to any hardware in the system, except the addressable switching means which treats one digital level, or bit, of the device address as a device turn on or turn off control signal.

The embodiments of the present invention described herein include the complete system of one or more addressable switching means, a central control unit in communication with a clock, a tone decoder and a tone generator as well as a telephone interface for connecting and disconnecting the central control unit to a telephone subscriber loop and a data structure for storing the turn on and turn off times for various appliances connected to an electrical distribution network. Provision may be made for the telephone accessible appliance control system to communicate back the success or failure of its operations including changing or adding new electrical load time set points or the success or failure of previous turn on or turn off set points. Clearly, various modifications of this complete system or portions of it may be employed to form other embodiments of the invention all contemplated by and within the spirit and scope of the invention. Furthermore, numerous substitutions or re-arrangements of the components and the sequence of operation of the components in these systems may be made without departing from the spirit and scope of the invention as set forth in the appended claims.

What I claim as my invention is:

1. Switching apparatus for time dependent switching of electric loads on a common three wire electrical distribution network comprising: tone decoder means for producing a predetermined coded signal corresponding to any series of unique tones out of a set of unique tones; local tone generation means connected to the tone decoder means for producing any series of unique tones out of a set of unique tones; telephone interface means adapted to be operatively coupled between a subscriber loop of a telephone network and said tone decoder means and being responsive to a predetermined number of ringing signals detected on said subscriber loop, whereby said tone decoder means will be connected to said subscriber loop and thereby receive any series of unique tones out of a set of unique tones produced by remote tone generation means at a call originating telephone in said telephone network; a data structure in communication with said tone decoder means for storing a plurality of coded signals produced by said tone decoder means thereby forming one or more device control codes, each device control code including a device status code and an electrical load address identifying a particular addressable switching means and a set point time code for identifying a particular coded current time signal; clock means for producing a coded current time signal representative of a day and the time of day; at least one addressable switching means adapted to be connected to a three wire electrical distribution network for selectively engaging or isolating a respective electrical load from said three wire electrical distribution network in response to a predetermined load control signal, the addressable switching means including means for producing a load control feedback signal produced in response to said predetermined load control signal; control means connected to and responsive to signals produced by said clock means and adapted to communicate with said addressable switching means via said three wire electrical distribution network and in communication with said data structure whereby a load control signal is produced by said control means in response to a match between a set point time of any device control code stored in said data structure and the current time signal, thereby engaging or isolating a respective electrical load from said three wire electrical distribution network, said control means including means responsive to said load control feedback signal whereby said control means manifests its response to said load control feedback signal by producing a unique audible tone; and the control means including means for modifying the status code in response to said load control feedback signal whereby said device status code is set to a first value when a load control feedback signal is received by said control means after a load control signal is produced by said control means, and is set to a second value when a load control feedback signal is not received by said control means after a load control signal is produced by said control means, and further comprising means for inputting into the control means electrical load addresses, whereby said control means will respond to an imputted electrical load address by producing a third unique audible tone when the device status code of the device control code associated with said electrical load address is equal to said first value, or by producing a fourth unique audible tone when the device status code of the device control code associated with said electrical load address is equal to said second value.

2. Switching apparatus as claimed in claim 1 wherein said telephone interface means further includes communication means adapted to be connected between said subscriber loop and said control means concurrently with said tone decoder means whereby said unique audible tones produced by said control means are communicated to said subscriber loop to be heard over any call originating telephone.

3. Switching apparatus as claimed in claim 1 wherein said load control feedback signal is communicated to said control means via said three wire electrical distribution network.

4. Switching apparatus as claimed in claim 3 wherein said telephone interface means further includes communication means adapted to be connected between said subscriber loop and said control means concurrently with said tone decoder means whereby said unique audible tones produced by said control means are communicated to said subscriber loop to be heard over any call originating telephone.

5. Switching apparatus as claimed in claim 1 wherein said set of unique tones consists of conventional dual tone multi-frequency tones used to effect dialing on said telephone network.

6. Switching apparatus as claimed in claim 1 further including display means in communication with said data structure whereby any one of the device control codes stored in said structure may be displayed.

7. Switching apparatus as claimed in claim 1 wherein said control means further includes apparatus for detecting a power outage and manifesting said detected power outage when power is restored by producing a second ongoing unique audible tone.

8. Switching apparatus as claimed in claim 1 and further comprising display means for indicating if a load control feedback signal is not received by said control means after a load control signal is produced by said control means.

9. Switching apparatus for time dependent switching of electric loads on a common three wire electrical distribution network comprising: tone decoder means for producing a predetermined coded signal corresponding to any series of unique tones out of a set of unique tones; local tone generation means connected to the tone decoder means for producing any series of unique tones out of a set of unique tones; telephone interface means adapted to be operatively coupled between a subscriber loop of a telephone network and said tone decoder means and being responsive to a predetermined number of ringing signals detected on said subscriber loop, whereby said tone decoder means will be connected to said subscriber loop and thereby receive any series of unique tones out of a set of unique tones produced by a remote tone generation means at a call originating telephone in said telephone network; a data structure in communication with said tone decoder means for storing a plurality of coded signals produced by said tone decoder means thereby forming one or more device control codes, each device control code including an electrical load address identifying a particular addressable switching means, a device status code, and a set point time code for identifying a particular coded current time signal; clock means for producing a coded current time signal representative of a day and the time of day; at least one addressable switching means adapted to be connected to a three wire electrical distribution network for selectively engaging or isolating a respective electrical load from said three wire electrical distribution network in response to a predetermined load control signal, the addressable switching means including means for producing a load control feedback signal in response to a said predetermined load control signal; control means connected to and responsive to signals produced by said clock means and adapted to communicate with said addressable switching means via said three wire electrical distribution network and in communication with said data structure whereby a load control signal is produced by said control means in response to a match between a set point time of any device control code stored in said data structure and the current time signal, thereby engaging or isolating a respective electrical load from said three wire electrical distribution network, the control means including means responsive to said load control feedback signal whereby said control means manifests its response to said load control feedback signal by producing a unique audible tone; the control means including means for modifying the status code in response to said load control feedback signal, whereby said device status code is set to a first value when a load control feedback signal is received by said control means after a load control signal is produced by said control means, and is set to a second value when a load control feedback signal is not received by said control means after a load control signal is produced by said control means; means for inputting into the control means electrical load addresses, whereby said control means will respond to an inputted electrical load address by producing a third unique audible tone when the device status code of the device control code associated with said electrical load address is equal to said first value, or by producing a fourth unique audible tone when the device status code of the device control code associated with said electrical load address is equal to said second value; the telephone interface means including communication means adapted to be connected between said subscriber loop and said control means concurrently with said tone decoder means whereby said unique audible tones produced by said control means are communicated to said subscriber loop to be heard over any call originating telephone; and a mode selector operatively connected to the control means and including means for activating alternatively the local tone generation means and the telephone interface means, whereby the tone decoder operates respectively in a local mode to accept tones from the local tone generation means and in a remote mode to accept tones from a remote tone generation means in the subscriber loop.

10. Switching apparatus as claimed in claim 9 and further comprising display means for indicating if a load control feedback signal is not received by said control means after a load control signal is produced by said control means.

* * * * *